United States Patent [19]

Lepain

[11] 4,224,152
[45] Sep. 23, 1980

[54] SURFACE ACTIVE COMPOSITIONS AND METHOD OF USE IN DISPERSING OR COLLECTING OIL SLICK

[75] Inventor: André O. Lepain, Rosières-St-André, Belgium

[73] Assignee: Labofina S.A., Brussels, Belgium

[21] Appl. No.: 973,665

[22] Filed: Dec. 27, 1978

[30] Foreign Application Priority Data

Dec. 28, 1977 [FR] France .............................. 77 39425

[51] Int. Cl.$^2$ ...................... B01F 17/34; B01J 13/00; C02B 1/18
[52] U.S. Cl. .................................. 210/729; 210/925; 252/170; 252/312; 252/356; 252/DIG. 1; 252/DIG. 6
[58] Field of Search ......... 252/312, 356, 170, DIG. 1; 210/DIG. 27, 59

[56] References Cited

U.S. PATENT DOCUMENTS

| | | | |
|---|---|---|---|
| 3,625,857 | 12/1971 | Weimer et al. | 252/312 |
| 3,959,134 | 5/1976 | Canevari | 252/312 X |

FOREIGN PATENT DOCUMENTS

| | | | |
|---|---|---|---|
| 1404684 | 9/1975 | United Kingdom | 252/356 |
| 1419803 | 12/1975 | United Kingdom | 252/532 |
| 1478008 | 6/1977 | United Kingdom | 210/59 |

*Primary Examiner*—Richard D. Lovering
*Attorney, Agent, or Firm*—Schwartz, Jeffery, Schwaab, Mack, Blumenthal & Koch

[57] ABSTRACT

Disclosed are surface-active compositions for dispersing or collecting oil slicks on water or for protecting or cleaning beaches, which compositions comprise
(a) a mixture of surface-active compounds comprising at least one solid compound and at least one liquid compound, and
(b) a mixture of solvents comprising a glycol ether and at least one n-paraffin having from about 10 to 16 carbon atoms.

11 Claims, No Drawings

SURFACE ACTIVE COMPOSITIONS AND METHOD OF USE IN DISPERSING OR COLLECTING OIL SLICK

BACKGROUND OF THE INVENTION

The present invention relates to surface-active compositions having a polyvalent action. More particularly, the present invention relates to surface-active compositions which allow not only treatment of oil-polluted water surfaces, but also protection and cleaning of beaches.

It is well known that, when oil is discharged into water, particularly into sea water, the oil comes up to the surface and forms a continuous film or slick which tends to continuously spread. This film of oil is undesirable because it represents a barrier to the transfer of oxygen and light from the atmosphere to support marine life. Moreover, these films of oil may reach and pollute the beaches.

Various techniques have been suggested for solving the oil contamination problem. For example, it has already been proposed to contact this oil film with a dispersing composition containing detergents in order to emulsify the oil with the water and to disperse the continuous oil fim in the form of small droplets. The continuous oil film is then broken, and there is again a transfer of oxygen and light from the atmosphere. However, this technique is not always suitable, particularly when the oil forming the film is highly viscous. Moreover, this dispersion technique requires high energy mixing, which is furnished by either artificial or natural agitation. It is clear that such a technique is not very efficient on a calm sea.

It has been also suggested to use oil collecting compositions, which are poured at the periphery of the oil slick in order to surround it and to avoid it from spreading anymore. One characteristic of these compositions resides in their spreading force which must be higher than that of the oil. This technique of contraction of oil slicks allows a substantially complete removal of the oil by the usual mechanical means. This technique is thus suitable on a calm sea, since no additional energy is required.

However, these oil collecting compositions, which are often in the form of a monolayer solid film of a surface-active agent, are efficient only during a limited period of time, which generally does not exceed 4 hours, and which depends on the solubility of the composition in the oil which must be repelled. After that period of time, the protective barrier breaks at several places, and the oil slick spreads again. In order to remedy this drawback, it has been suggested to introduce the surface-active agent in a hydrocarbon vehicle in order to form a multilayer liquid film of surface-active agent, which more quickly spreads and thus increases the contraction of the oil slick. However, a liquid film which has no support may also spread in a direction opposite to that where it must act.

Moreover, in the scope of beach protection, the composition to be used must at least form a solid film, in order not to penetrate into the sand and also to avoid the impregnation of the sand by the pollutant oil.

Therefore, a surface-active composition with polyvalent action should fulfill the following conditions in order to be efficient on solid substrates as well as on liquid substrates:

form at least a multilayer liquid film, form at least a solid film having a reduced solubility in the oil to be treated, this solid film acting as a support for the liquid film, have a spreading force higher than 40 dyne/cm in order to be efficient as an oil collecting composition, have a sufficient emulsifying power to emulsify the oil, either when the composition is poured onto the oil slick, or when the oil slick comes onto the film formed on the beach, be handleable at low temperatures, have a flash point higher than 80° C., and be biodegradable and non-toxic.

Up until now, none of the proposed compositions fulfills all these conditions.

SUMMARY OF THE INVENTION

Therefore, it is an object of the present invention to provide a surface-active polyvalent composition which fulfills all the foregoing conditions.

Another object of the present invention is to provide a surface-active polyvalent composition which not only is particularly efficient as an oil collecting composition, but also as a protective composition for the beaches.

Still another object of the present invention resides in the provision of an improved method for cleaning up oil spills, both on the sea and on the beaches.

In accomplishing the foregoing objects, there has been provided in accordance with one aspect of the present invention a surface-active composition for collecting or dispersing oil slicks on a water surface, or for protecting or cleaning the beaches, comprising (a) a mixture of surface-active compounds including at least one solid surface-active compound and at least one liquid surface-active compound, and (b) a mixture of solvents comprising a glycol ether and at least one n-paraffin having from about 10 to 16 carbon atoms. Preferably, the composition comprises from about 18 to 40% by weight, based on the composition, of the mixture of surface-active compounds, and from about 82 to 60% by weight, based on the composition, of the mixture of solvents. Most preferably, the amount of solid surface-active compound comprises between about 16 and 25% by weight, based on the mixture of surface-active compounds, and the amount of liquid surface-active compound comprises between about 84 and 75% by weight, based on the mixture of surface-active compounds, whereas the amount of glycol ether comprises between about 20 and 50% by weight, based on the mixture of solvents, and the amount of n-paraffins comprises between about 80 and 50% by weight, based on the mixture of solvents.

In accordance with another aspect of the invention, there has been provided a method for dispersing or collecting an oil slick on water, comprising the step of applying a surface-active composition of the above-described type to the surface of the water affected by the oil slick. There has also been provided a method for protecting or cleaning a beach against damage from an oil slick, comprising the step of applying to the beach a barrier of a surface-active composition as defined above.

Other objects, features and advantages of the present invention will become readily apparent to a person of ordinary skill in the art from the detailed description of preferred embodiments which follows.

DETAILED DESCRIPTION OF PREFERRED EMBODIMENTS

The surface-active polyvalent compositions of the present invention for collecting or dispersing oil slicks on water, or protecting or cleaning the beaches comprise (a) a mixture of surface-active compounds constituted of at least one solid compound and at least one liquid compound, and (b) a mixture of solvents comprising a glycol ether and n-paraffins having from about 10 to 16 carbon atoms. Particularly effective compositions comprise from about 18 to 40% by weight, based on the total weight of the composition, of the mixture of surface-active compounds and from about 82 to 60% by weight of the mixture of solvents.

The mixture of surface-active compounds comprises at least one solid surface-active compound having a reduced solubility in the oil to be treated. This solid surface-active compound is selected from the group comprising the sorbitan monoesters of saturated aliphatic carboxylic acids having from about 16 to 20 carbon atoms. The mixture of surface-active compounds also comprises a liquid surface-active compound having a spreading force higher than about 40 dynes/cm. This latter compound is selected from the group comprising the liquid sorbitan monoesters of aliphatic carboxylic acids having from about 10 to 20 carbon atoms, and the liquid polyethyleneglycol monoesters of these same acids.

Generally, the mixture of surface-active compounds comprises from about 16 to 25% by weight, based on the weight of the mixture, of solid surface-active compounds, and from about 84 to 75% by weight of liquid surface-active compounds. Preferably, the weight ratio between the solid compound and the liquid compound is comprised between about 1:2 and 1:5.

Compositions which contain less than about 16% by weight of solid surface-active compound in the mixture of surface-active compounds do not permit achievement of the maximum contraction of the oil slick. On the other hand, compositions containing more than about 25% by weight of this same solid surface-active compound are cloudy, and moreover, it is more difficult to pump the mixture at low temperatures, e.g., on the order of from about 0 to minus 10° C.

A particularly advantageous mixture of surface-active compounds comprises about 20% by weight of sorbitan palmitate as the solid surface-active compound and about 80% by weight of sorbitan monooleate as the liquid surface-active compound.

The mixture of solvents present in the composition of the invention comprises a glycol ether, in an amount corresponding to about 20 to 50% by weight, based on the weight of the mixture of solvents, and n-paraffins having from about 10 to 16 carbon atoms, in an amount corresponding to about 80 to 50% by weight, based on the mixture of solvents. As examples of suitable glycol ethers for the compositions of the invention, there may be mentioned, monoethyleneglycol monobutyl ether, diethyleneglycol monomethyl ether, diethyleneglycol monoethyl ether, diethyleneglycol monobutyl ether, dipropyleneglycol monomethyl ether and tripropyleneglycol monomethyl ether.

The weight ratio between the amount of n-paraffins and that of glycol ether is generally comprised between about 1:1 and 4:1. An excess of glycol ether with regard to n-paraffin leads to cloudy compositions. On the other hand, an amount of n-paraffins higher than about 80% by weight, based on the weight of solvent, results in cloudy compositions having a lower spreading force.

A particularly advantageous mixture of solvents comprises about 50% by weight of monoethyleneglycol monobutyl ether and about 50% by weight of a mixture of n-paraffins having from about 10 to 13 carbon atoms.

The following examples are given in order to better illustrate the present invention without however limiting its scope.

EXAMPLE 1

A surface-active composition is prepared wherein the cited percentages are weight percentages.

This composition contains:
20% sorbitan monooleate
5% sorbitan monopalmitate
35% diethyleneglycol monoethyl ether
40% of a mixture of n-paraffins having from 10 to 13 carbon atoms.

This composition has the following characteristics:
spreading force: 43.1 dyne/cm
freezing point: −22° C.
cloud point: 0° C.
flash point: 70° C.
Fluidity to minus 10° C.*
(* the composition may be pumped to a temperature of minus 10° C.).

This composition is tested with several types of crude petroleum in order to determine its repelling velocity together with its efficacy duraction. The repulsion force of the composition is calculated by the difference between the spreading force of the composition and that of crude petroleum. The repelling velocity is given by the time which is necessary to repel an oil slick, artificially created by pouring 10 ml of crude petroleum in a basin containing 5 liters of water or synthetic sea water. The efficacy duration of the composition is determined by measuring the diameter of an oil slick artificially created by pouring 10 ml of crude petroleum in a basin containing 3 liters of synthetic sea water, at the surface of which a droplet of the composition to be tested is allowed to fall. Synthetic sea water is prepared by mixing 105 g of sodium chloride with 3 liters of distilled water.

The results obtained with the foregoing composition are indicated in Tables I and II below.

TABLE I

| Type of Water | Crude Petroleum Used | Spreading Force of the crude petroleum (dyne/cm) | Repelling Force of the composition (dyne/cm) | Repelling velocity (sec) |
|---|---|---|---|---|
| Fresh water | Kuwait topped crude petroleum | 28.7 | 14.4 | 3.8 |
| Synthetic sea water | light gas-oil | 14.4 | 28.7 | 12.5 |
| Synthetic sea water | light fuel | 18.2 | 24.9 | 44.0 |

TABLE II

| Type of Water | Crude Petroleum used | Diameter in mm of the oil slick after stated time in min. | | | | | | | | |
|---|---|---|---|---|---|---|---|---|---|---|
| | | 1 | 10 | 20 | 30 | 40 | 50 | 60 | 120 | 1200 |
| Synthetic sea water | Kuwait topped crude pe- | | | | | | | | | |

TABLE II-continued

| Type of Water | Crude Petroleum used | Diameter in mm of the oil slick after stated time in min. | | | | | | | | |
|---|---|---|---|---|---|---|---|---|---|---|
| | | 1 | 10 | 20 | 30 | 40 | 50 | 60 | 120 | 1200 |
| | troleum | 53 | 56 | 58 | 59 | 61 | 62 | 62 | 66 | 70 |

By way of comparison, two compositions are tested. The first one, called composition A, comprises 80 parts by weight of a mixture of straight chain aliphatic alcohols having from 14 to 15 carbon atoms, 16 parts by weight of isopropylic alcohol and 4 parts by weight of a mixture of straight chain aliphatic alcohols having from 12 to 15 carbon atoms and containing 3 moles of ethylene oxide. This composition A forms only a solid monolayer film. The second one, called composition B, comprises 40% by weight of sorbitan monooleate, 5% by weight of sorbitan monolaurate, 30% by weight of an isoparaffin and 25% by weight of diethyleneglycol monobutyl ether. This composition forms only a liquid multilayer film.

The results obtained with these compositions, with tests as described above, are indicated in Tables III and IV below.

TABLE III

| Type of Water | Crude Petroleum Used | Spreading force of the crude petroleum (dyne/cm) | Repelling force of composition A (dyne/cm) | Repelling force of composition B (dyne/cm) | Repelling velocity of composition A (sec) | Repelling velocity of composition B (sec) |
|---|---|---|---|---|---|---|
| Fresh water | Kuwait topped crude petroleum | 28.7 | 10.8 | 14.8 | 138.0 | 5.3 |
| Synthetic sea water | light gasoil | 14.4 | 25.1 | 29.1 | 217.0 | 256.0 |
| Synthetic sea water | light fuel | 18.2 | 21.3 | 25.3 | 395.0 | 76.1 |

TABLE IV

| Type of Water | Crude Petroleum Used | Diameter in mm of the oil slick after stated time in min. | | | | | | | | |
|---|---|---|---|---|---|---|---|---|---|---|
| | | 1 | 10 | 20 | 30 | 40 | 50 | 60 | 120 | 1200 |
| Synthetic sea water | Kuwait topped crude petroleum | | | | | | | | | |
| Composition A | | 54 | 70 | 90 | 110 | 125 | 132 | 136 | 163 | 245 |
| Composition B | | 70 | 81 | 94 | 97 | 99 | 100 | 101 | 103 | 115 |

These comparative examples clearly show that the composition of the invention not only has a repelling velocity higher than those of compositions A and B, but also a much longer efficacy duration.

EXAMPLE 2

Surface-active compositions are prepared, wherein the cited percentages are weight percentages:
Composition 1 contains:
15% sorbitan monooleate
7.5% sorbitan monopalmitate
30% diethyleneglycol monomethyl ether
47.5% of a mixture of n-paraffins having from 10 to 13 carbon atoms.
This composition has the following characteristics:
Spreading force: 42.3 dyne/cm
Cloud point: 3° C.
Flash point: >70° C.
Composition 2 contains:
18% sorbitan monoleate
4% sorbitan monostearate
28% monoethyleneglycol monobutylether
50% of a mixture of n-paraffins having from 10 to 13 carbon atoms.
This composition has the following characteristics:
Spreading force: 42.1 dyne/cm
Cloud point: 3° C.
Flash point: >70° C.
Composition 3 contains:
20% polyethyleneglycol (molecular weight 200) monoleate
5% sorbitan monopalmitate
15% diethyleneglycol monobutyl ether
60% of a mixture of n-paraffins having from 13 to 16 carbon atoms.
This composition has the following characteristics:
Spreading force: 42.0 dyne/cm
Cloud point: 1° C.
Flash point: >70° C.

The repelling velocity of these compositions and their efficacy duration with regard to a Kuwait topped crude petroleum are determined according to the methods described in Example 1.

The results are indicated in Tables V and VI herebelow.

TABLE V

| | Repelling velocity (sec) |
|---|---|
| Composition 1 | 4.2 |
| Composition 2 | 3.9 |
| Composition 3 | 4.0 |

TABLE VI

| | Diameter in mm of the oil slick after stated time (min.) | | | |
|---|---|---|---|---|
| | 1 | 10 | 120 | 1200 |
| Composition 1 | 55 | 59 | 68 | 73 |
| Composition 2 | 53 | 57 | 68 | 72 |
| Composition 3 | 56 | 57 | 68 | 70 |

By way of comparison, several compositions are prepared which are outside the scope of the present invention.
Composition A contains:
9% sorbitan monopalmitate
30% sorbitan monooleate 61% of a mixture of n-paraffins having from 10 to 13 carbon atoms.

This composition has a cloud point of 20° C., which is much too high, and therefore this composition has an insufficient fluidity at low temperatures.

Composition B contains:
9% sorbitan monopalmitate
30% sorbitan monooleate
61% diethyleneglycol monoethyl ether.

This composition has a cloud point of 16° C., which is much too high and therefore this composition has an insufficient fluidity at low temperatures.

Composition C contains:
25% sorbitan monooleate
35% diethyleneglycol monoethyl ether
40% of a mixture of n-paraffins having from 10 to 13 carbon atoms.

This composition has an efficacy duration of 4 hours with regard to a Kuwait topped crude petroleum. This result is significantly lower than that obtained with the compositions of the invention.

Composition D contains:
6.5% sorbitan monopalmitate
43.5% diethyleneglycol monoethyl ether
50% of a mixture of n-paraffins having from 10 to 13 carbon atoms.

A separation into two phases is observed, and therefore, this composition is not usable.

EXAMPLE 3

The surface-active composition described in Example 1 is tested as a protective composition for beaches against oil contamination due to the deposition of a hydrocarbon layer. A sand beach is artificially created in a plastic basin. The composition described in Example 1 is pulverized and spread along a band parallel to the water line of this artificial beach. 20 ml of a Kuwait topped crude petroleum are deposited on the synthetic sea water plane. Water is thereafter added in the basin in order that the water level reaches the treated zone, and the effect of waves coming onto the beach is simulated.

It is observed that oil is repelled and does not adhere to the treated sand. The composition is so efficient that the mere treatment of bands parallel to the water line is sufficient, without having to treat the whole beach. Moreover, a slight stirring of the water induces a fine dispersion of the crude petroleum into the water.

The composition of the invention may also be applied to protect the rocks, constructive works or even vegetation growing on the seaside.

What is claimed is:

1. A surface-active composition for collecting or dispersing oil slicks on a water surface or for protecting or cleaning beaches,
   said composition comprising from about 18 to about 40% by weight of a mixture of surface-active compounds including at least one solid surface-active sorbitan monoester of a saturated aliphatic carboxylic acid having from 16 to 20 carbon atoms;
   said solid sorbitan monoester comprising from about 16 to about 25% by weight of said surface-active compound mixture; said surface-active compound mixture further comprising at least one surface-active compound selected from the group consisting of liquid monoesters of aliphatic carboxylic acids having from 10 to 20 carbon atoms with sorbitan or with polyethylene glycol;
   said liquid surface-active compound comprising from about 75 to about 84% by weight of said surface-active compound mixture;
   said composition further comprising from about 60 to about 82% by weight of a mixture of solvents comprising a glycol ether and at least one n-paraffin having from 10 to 16 carbon atoms;
   said glycol ether comprising from about 20 to about 50% by weight of said solvent mixture and said n-paraffin comprising from about 50 to about 80% by weight of said solvent mixture.

2. A composition according to claim 1 wherein said solid sorbitan monoester is selected from the group consisting of sorbitan monopalmitate and sorbitan monostearate.

3. A composition according to claim 1 wherein said surface-active liquid monoester is selected from the group consisting of sorbitan monooleate and polyethylene glycol monooleate.

4. A surface-active composition according to claim 1, wherein said liquid surface-active compound is characterized by a spreading force higher than about 40 dyne/cm.

5. A surface-active composition according to claim 1, wherein the weight ratio between said solid surface-active compound and said liquid surface-active compound is between about 1:2 and 1:5.

6. A surface-active composition according to claim 5, wherein said mixture of surface-active compounds comprises about 20% by weight, based on the mixture of surface-active compounds, of sorbitan palmitate and about 80% by weight, on the same base, of sorbitan monooleate.

7. A surface-active composition according to claim 1, wherein said glycol ether comprises monoethyleneglycol monobutyl ether, diethyleneglycol monomethyl ether, diethyleneglycol monoethyl ether, diethyleneglycol monobutyl ether, dipropyleneglycol monomethyl ether, or tripropyleneglycol monomethyl ether.

8. A surface-active composition according to claim 1, wherein the weight ratio between the amount of n-paraffin and that of glycol ether comprises between about 1:1 and 4:1.

9. A surface-active composition according to claim 1, wherein the mixture of solvents comprises about 50% by weight, based on the mixture of solvents, of monoethyleneglycol monobutyl ether and about 50% by weight, on the same base, of a mixture of n-paraffins having from about 10 to 13 carbon atoms.

10. A method for dispersing or collecting an oil slick on water, comprising the step of applying a surface-active composition as defined by claim 1 to the surface of the water affected by the oil slick.

11. A method for protecting or cleaning a beach against damage from an oil slick, comprising the step of applying to the beach a barrier of a surface-active composition as defined by claim 1.

* * * * *